United States Patent
Li et al.

(10) Patent No.: US 11,252,973 B2
(45) Date of Patent: Feb. 22, 2022

(54) TECHNOLOGY AND DEVICE FOR FRUIT AND VEGETABLE PHASE-TEMPERATURE PRECOOLING COMPATIBLE MULTI-COUPLING ANTI-AGING TREATMENT

(71) Applicant: Tianjin Lvxin Cryogenic Science and technology Co., Tianjin (CN)

(72) Inventors: Xihong Li, Tianjin (CN); Weiqiao Yang, Tianjin (CN); Yao Tang, Tianjin (CN); Yuzheng Zhang, Tianjin (CN); Gang Zhu, Tianjin (CN); Xianpu Tang, Tianjin (CN); Yanfang Pan, Tianjin (CN); Xiaoyu Jia, Tianjin (CN); Yu Wang, Tianjin (CN)

(73) Assignee: Tianjin Lvxin Cryogenic Science and technology Co., Ltd., Tianjin (CN)

( * ) Notice: Subject to any disclaimer, the term of this patent is extended or adjusted under 35 U.S.C. 154(b) by 283 days.

(21) Appl. No.: 16/166,119

(22) Filed: Oct. 21, 2018

(65) Prior Publication Data

US 2019/0053507 A1    Feb. 21, 2019

Related U.S. Application Data

(63) Continuation of application No. PCT/CN2018/075718, filed on Feb. 8, 2018.

(30) Foreign Application Priority Data

Jul. 18, 2017    (CN) .......................... 201710584178.9

(51) Int. Cl.
*A23B 7/04* (2006.01)
*A23B 7/157* (2006.01)
(Continued)

(52) U.S. Cl.
CPC .............. *A23B 7/04* (2013.01); *A23B 7/0425* (2013.01); *A23B 7/144* (2013.01); *A23B 7/152* (2013.01);
(Continued)

(58) Field of Classification Search
None
See application file for complete search history.

(56) References Cited

U.S. PATENT DOCUMENTS 1,973,022 A * 9/1934 Strobell ................ F25D 11/003
                                                        62/89
3,792,595 A * 2/1974 Willis .................... F25D 17/005
                                                        62/414
(Continued)

FOREIGN PATENT DOCUMENTS

CN        106740401 A      5/2017
CN        107242290 A      10/2017
(Continued)

OTHER PUBLICATIONS

Internation Search Report of PCT/CN2018/075718, dated Apr. 23, 2018.

*Primary Examiner* — Ibrahime A Abraham
*Assistant Examiner* — John J Norton

(57) ABSTRACT

A device for fruit and vegetable phase-temperature precooling compatible multi-coupling anti-aging treatment comprises a refrigeration house with a plurality of differential pressure precooling devices placed therein. The differential pressure precooling device comprises a hermetic seal tunnel precooling box, a separator plate is fixedly mounted at an upper part inside the tunnel precooling box and in parallel to a top wall of the tunnel precooling box with a space formed therebetween; the separator plate extends to the bottom of the tunnel precooling box; a venting plate is fixedly mounted to one side of the separator plate and in parallel to a side wall (Continued)

of the tunnel precooling box with a space formed therebetween; a section of wind shield is vertically and downwardly mounted to an end of the other side of the separator plate; an axial flow fan is mounted at a corner of the tunnel precooling box between the separator plate and the venting plate.

4 Claims, 2 Drawing Sheets

(51) Int. Cl.
    *A23B 7/152*     (2006.01)
    *A23B 7/154*     (2006.01)
    *A23B 7/144*     (2006.01)
(52) U.S. Cl.
    CPC .............. *A23B 7/154* (2013.01); *A23B 7/157* (2013.01); *A23V 2002/00* (2013.01)

(56) References Cited

U.S. PATENT DOCUMENTS

| | | | | |
|---|---|---|---|---|
| 4,532,774 | A | * | 8/1985 | Burns ....................... B60P 3/20 280/415.1 |
| 4,736,592 | A | * | 4/1988 | Ohling .................... F25D 17/06 62/62 |
| 5,671,609 | A | * | 9/1997 | Lionetti ................ A23B 7/0425 454/118 |
| 5,816,053 | A | * | 10/1998 | Huether .................... A23B 4/00 62/65 |
| 2015/0056349 | A1 | | 2/2015 | Li |
| 2017/0156355 | A1 | * | 6/2017 | Oldfield .................. A23B 7/152 |

FOREIGN PATENT DOCUMENTS

| | | |
|---|---|---|
| CN | 107455449 A | 12/2017 |
| JP | 6094023 A | 5/1985 |

\* cited by examiner

TECHNOLOGY AND DEVICE FOR FRUIT AND VEGETABLE PHASE-TEMPERATURE PRECOOLING COMPATIBLE MULTI-COUPLING ANTI-AGING TREATMENT

CROSS-REFERENCE TO RELATED APPLICATIONS

This application is a continuation of International Patent Application No. PCT/CN2018/075718 with a filing date of Feb. 8, 2018, designating the United States, now pending, and further claims priority to Chinese Patent Application No. 201710584178.9 with a filing date of Jul. 18, 2017. The content of the aforementioned applications, including any intervening amendments thereto, are incorporated herein by reference.

TECHNICAL FIELD

The disclosure belongs to the field of fruit and vegetable preservation, and particularly relates to a fruit and vegetable phase-temperature precooling compatible multi-coupling anti-aging treatment technology and device.

BACKGROUD OF THE PRESENT INVENTION

Preservation of fruits and vegetables is based on postharvest physiology and pathology and with temperatures, humidity, gases and anticorrosion as means, wherein activity ratio of temperature is about 60%-70%, humidity, gases and anticorrosion each accounts for 10%-15%. Thus, under the condition that cold damage or freeze injury is not generated, the lower the preservation temperature of fruits and vegetables is, the better the preservation effects are. The precooling for removal of field heat as soon as possible is defined as a first 1 km in cold chain. A technology that a refrigeration house invented by an engineer James from Australia in 1851 is used for storing fruits and vegetables is considered as a first revolution, a controlled atmosphere cold storage invented by Kidd and West from University of Cambridge in 1927 is considered as a second revolution, and some people say that a subatmospheric pressure storage technology proposed by Bouguer in 1962 or an ice temperature warehouse storage technology proposed by Yamane Akimi from Japan in 1972 is considered as a third revolution.

The refrigeration house is subjected to temperature reduction and constant temperature depending on mechanical refrigeration, with temperature difference being ±0.5-1° C.; for the CA cold storage, concentrations of oxygen and carbon dioxide gases under the storage temperature are regulated at random on the basis of the refrigeration house; the ice temperature warehouse has the same principle as the refrigeration house, but temperature control precision is ±1° C. higher than that of a reduced pressure technology, however, the common defect of the refrigeration house, the controlled atmosphere cold storage, a reduced pressure house and the ice temperature warehouse technologies is heat and mass transfer. When in operation, a humidifier is continuously used for humidifying, and meanwhile an air cooler continuously performs defrosting.

Lingwu long jujube is a good fresh fruit variety having local features in Ningxia Hui Nationality Autonomous, China. Its fruit is colorful in color, thick in pulp, sour and sweet, delicious, rich in multivitamins and minerals, especially, has the highest VC content, is honored as live "vitamin pill", and has a reputation of "king of fruits". Heat carried by Lingwu long jujube after being harvested is large, a high temperature can increase respiration intensity of the Lingwu long jujube so as to finally lead to aging and deterioration. Precooling aims to maintain the quality of Lingwu long jujube and is one of important means to extend a shelf life. Through precooling, the loss of the product can be reduced, energy is saved. However, the traditional refrigeration house is large in house size and has a high requirement on quantity of fruits and vegetables. Furthermore, when a lot of fruits and vegetables are simultaneously precooled, the precooling efficiency is low, precooling time consumption is long, and energy consumption is large.

Precooling is incapable of preventing corrosion and mold; under the closed environment, temperature reduction cannot be performed; during the precooling for 10 hours, golden treatment time is within 10 hours, anticorrosion and mold prevention are simultaneously completed, and precooling, anticorrosion, mold prevention and anti-aging processes are completed within the golden time.

The existing technology has the disadvantages that:

1. Most of the existing refrigeration houses performs static precooling, which is slow in heat and mass transfer, low in cold capacity utilization rate and long in precooling time consumption, and easily causes water loss. 2. Most of fruit and vegetable treatment manners are that fruits and vegetables are precooled and then subjected to preservative treatment, in such a way, the optimal preservation time of fruits and vegetables are easily missed. 3. The traditional tunnel differential pressure precooling has only one temperature reducing manner, and thus cannot select a specific temperature reducing manner directed to the variety of fruits and vegetables, for example, the Lingwu long jujube easily generates a purupuru disease due to adoption of a rapid temperature reduction manner under the high-temperature and high-humidity environment. 4. In the prior art, a preservative cannot be added in the precooling, and addition of no preservative while precooling is result from heat and mass transfer so that the preservative cannot functions; 1-MCP is contained, which is toxic to human; in the present application, each space is an airtight independent space, and unit operation is carried out. 5. The first defect of the traditional precooling technology is heat and mass transfer; fruit and vegetable precooling technologies such as refrigeration house static precooling, differential pressure tunnel air precooling, cold water precooling and vacuum precooling have the common features that fruits and vegetables continuously loss water while precooling and reducing temperature; in the process of precooling, the larger lost water amount is, the rapid the temperature reducing and water losing speed is. 6. The second defect of the traditional precooling technology is that environment development cannot be compatible with precooling and disease-resistant anti-aging treatment. Based on the above first defect of precooling heat and mass transfer, in the process of precooling fruits and vegetables, even though a totally closed box type process technology is adopted, the air cooler of a refrigerating system adsorbs water, a physiological regulator, a preservative and the like of an environment phase while strengthening heat exchange so that precooling of fruits and vegetables cannot be compatible with disease-resistant anti-aging treatment, that is to say, because temperature reduction is carried out in advance, the optimal disease-resistant anti-aging time has to be sacrificed, for example, the optimal treatment time of an ethylene antagonist 1-MCP (1-methyl cyclopropene) is within 24 after harvest, while the optimal precooling time of fruits and vegetables is also within 24 hours after harvest, and therefore a manner that precooling is performed and then 1-MCP treatment is adopted has to be adopted. 7. The third defect of the traditional precooling technology is that controlled atmosphere, pressure reduction and precise ice temperature control can not be collaborative, that is to say, the precise temperature control of large exchanged heat cannot be met while controlled atmosphere and pressure reduction.

According to retrieval, patent documents related to the present application particularly disclose the following contents and comparison analysis is as follows:

1. Compared with Chinese Patent No. CN105794953A, entitled with differential pressure precooling system and method, which mainly describes that a differential pressure precooling system and method can rapidly cool fruits and vegetables while supplementing water lost from fruit and vegetable agricultural products in the process of reducing the temperature, so as to improve the preservation rate of fruit and vegetable agricultural products. The existing problem is that fruits and vegetables cannot undergo preservative treatment while precooling.

2. Compared with Chinese Utility Model No. CN205174974U, entitled with a tunnel type differential pressure precooling device for kiwi fruits, which solves the defects that the traditional precooling house and forced ripening house have single functions, achieves a fact that preccoling and forced ripening are simultaneously performed in one house, sufficiently utilizes space and time used by the house and reduces building cost. The existing problem is that there is no stifling box, the function is single, forced ripening is only performed, and an airtight and inner circulating state cannot be built.

3. Compared with Chinese Utility Model No. CN204132285U, entitled with a mini differential pressure type rapid precooling and air stifling device, which can simultaneously control gases and humidity, is simple in structure and convenient to operate, a fruit and vegetable storage chamber is adjustable in capacity. The existing problem is that although a problem of precooling and forced ripening is solved, precooling can not be performed as to the variety of fruits and vegetables, and fruit and vegetable precooling diseases are easily generated.

In order to solve the above problems, the present application provides a set of new precooling systems, thereby perfectly solving the above problems.

SUMMARY OF PRESENT INVENTION

The objective of the disclosure is to overcome the disadvantages in the prior art and provide a technology and device for fruit and vegetable phase-temperature precooling compatible multi-coupling anti-aging treatment, which have the advantages of rapid precooling and convenient operation, and are suitable for precooling in a fruit garden if a preservative is added.

In order to solve the above technical problem, the technical solution adopted by the disclosure is as follows:

A device fruit and vegetable phase-temperature precooling compatible multi-coupling anti-aging treatment comprises a refrigeration house in which a plurality of differential pressure precooling devices are placed; the structure of the differential pressure precooling device comprises a hermetic seal tunnel precooling box, a separator plate is fixedly mounted at an upper part of the inside of the tunnel precooling box and is arranged in parallel to a top wall of the tunnel precooling box with a space formed between the separator plate and the top wall; the separator plate extends to the bottom of the tunnel precooling box; a venting plate is fixedly mounted to one side of the separator plate and is arranged in parallel to a side wall of the tunnel precooling box with a space formed between the venting plate and the side wall; a section of wind shield is vertically and downwardly mounted to an end of the other side of the separator plate; an axial flow fan is mounted at a corner of the tunnel precooling box, the corner is located between the separator plate and the venting plate; an air inlet of the axial flow fan corresponds to an upper space of the separator plate, and an air outlet corresponds to the space between the venting plate and the side wall of the tunnel precooling box; a plurality of fruit frames are arranged in the tunnel precooling box and located between the venting plate and the wind shield, and Lingwu long jujube fruit cases are stacked on the fruit frames; a plurality rows of vacuum heat exchange tubes are hermetically mounted on the separator plate, one ends of the vacuum heat exchange tubes are located in the tunnel precooling box, and the other ends are located in a refrigeration house; a low temperature of the refrigeration house is introduced into the tunnel precooling box to achieve rapid temperature reduction in the tunnel precooling box under airtight regulation; an ultrasonic nebulizer is mounted on the separator plate at one side close to an axial flow fan; the ultrasonic nebulizer is filled with preservative solution; in the process of cold air circulation, the fan circulates the preservative solution to each corner of the tunnel precooling box; an ozone generator and an ultraviolet sterilization device are arranged in a hermetic seal tunnel precooling box; the preservative comprises the following components: 1-3 parts of methyl jasmonate, 2-3 parts of Tecto® (thiabendazole), 2-3 parts of sodium hydrogen peroxide, 2-3 parts of salicylic acid and 0.5-1 part of 1-MCP.

Furthermore, a size of particles of the preservative solution sprayed out from the ultrasonic nebulizer ranges from 0.5 μm to 0.8 μm.

Furthermore, a length of the wind shield is ⅓ that of the venting plate.

Furthermore, the preservative is prepared by taking raw materials in parts by weight and dissolving the raw materials with water, wherein, the addition amount of water is 80-100 parts.

Furthermore, the tunnel precooling box is a plastic curtain or side walls of the tunnel precooling box are made ofinsulation plates.

The disclosure has the beneficial effects that:

1. According to the disclosure, heat exchange tubes are mounted on the upper part of the differential pressure precooling device, an axial flow type exhaust fan absorbs heat from cargoes, hot wind enters a venting pipeline, the heat exchange tubes exchange cold air in the refrigeration house with hot wind in the cargoes, thereby significantly improving precooling efficiency. In this disclosure, heat exchange tubes refer to heat pipes.

2. According to the disclosure, a preservative having a molecular intercalation and placeholder function is added in the cargoes while precooling to preserve cargoes while precooling, thereby obviously shortening storage pre-treatment time and improving the preservation length of cargoes.

3. According to the disclosure, a fact that the traditional differential pressure precooling device adopts a totally closed form is changed, heat but not mass is transferred via heat tubes so as to seal the preservative to prevent the volatilization of the preservative, thereby reducing loss of cargo water in the process of precooling, reducing cold capacity loss in the process of precooling and quickening precooling efficiency.

4. According to the disclosure, a totally closed form is adopted, loss of cargo water is reduced and is 2-3 times that of static precooling, cold capacity loss is reduced, addition of heat exchange tubes on the basis of the traditional tunnel differential pressure precooling device can significantly improve precooling efficiency which is improved by 3-5 times than that of static precooling, and improved by approximate 1 time than opened type differential pressure precooling. Addition of a preservative when in precooling can result in a fact that storage pretreatment time is shortened by 2 times, the preservation length of cargoes is extended by 1.5 times, and the preservation length of cargoes is significantly increased.

5. This device is in a totally closed state, a vacuum heat exchange tube is mounted at the upper end of the tunnel, the vacuum tube penetrates through the venting pipeline to extend into the tunnel, the axial flow type exhaust fan extracts hot air in the tunnel to pass through the heat exchange tube, the heat exchange tube exchanges cold air outside the tunnel with hot wind of cargoes in the tunnel to promote continuous reduction of temperature in the tunnel to form a closed internal circulating state, thereby obviously quickening precooling efficiency. The temperature is constant, humidifying is not performed, and energy consumption is saved.

6. According to the disclosure, the preservative is added in the precooling device while precooling, the preservative is added during the golden period of efficient heat transfer and precooling, preservative treatment is performed on precooled cargoes through internal circulation of the closed device so as to form a preservation effect on cargoes while precooling, thereby obviously shortening the storage pretreatment time and improving the preservation length of cargoes.

7. According to the disclosure, temperature can be rapidly reduced through precooling, and the temperature reducing speed of the device is targeted to be set aiming at different fruit and vegetable varieties.

8. Heat but not mass is transfer. A refrigerating system and a precooling and temperature reduction system are independent each other. The fruit and vegetable precooling system is airtight but does not preserve heat, wherein forced heat exchange when in temperature reduction is achieved depending on synergism of heat exchange tubes and forced convection of the axial flow fan.

9. Temperature reduction is compatible with disease resistance and aging resistance. The precooling temperature reduction system only has forced heat exchange without mutual exchange or transfer of media. Thus, within the first time after harvest, precooling is performed while an antagonist such as 1-MCP, a resistance inducer such as methyl jasmonate, a disease resistant agent such as calcium chloride, a bactericide such as sulfur dioxide, ozone, or physics such as static electricity and electric field and other preservation treatment is performed. The preservative can be either a gas or liquid nano atomizing gas.

10. Temperature reduction is synergic with controlled atmosphere, pressure reduction and precise ice temperature control. Precooling temperature reduction can regulate components of the gas at random like the controlled atmosphere cold storage at the same time and regulate the pressure like a pressure reduction house, and the temperature fluctuates $\leq \pm 0.1°$ C. like the ice temperature warehouse.

DETAILED DESCRIPTION OF PREFERRED EMBODIMENTS

Figure 1:
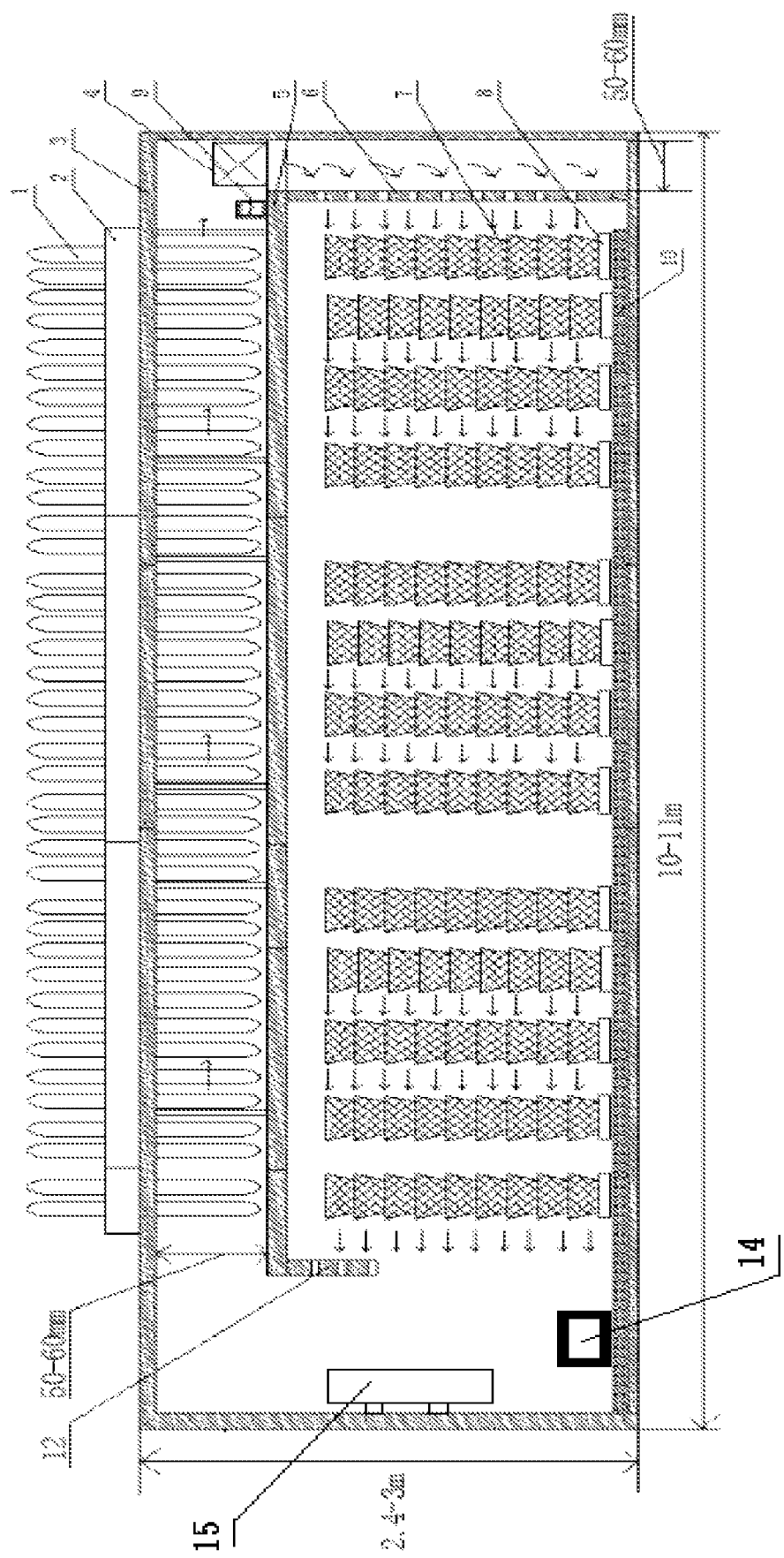
FIG. 1 is a structural diagram of a differential pressure precooling device.
Figure 2:
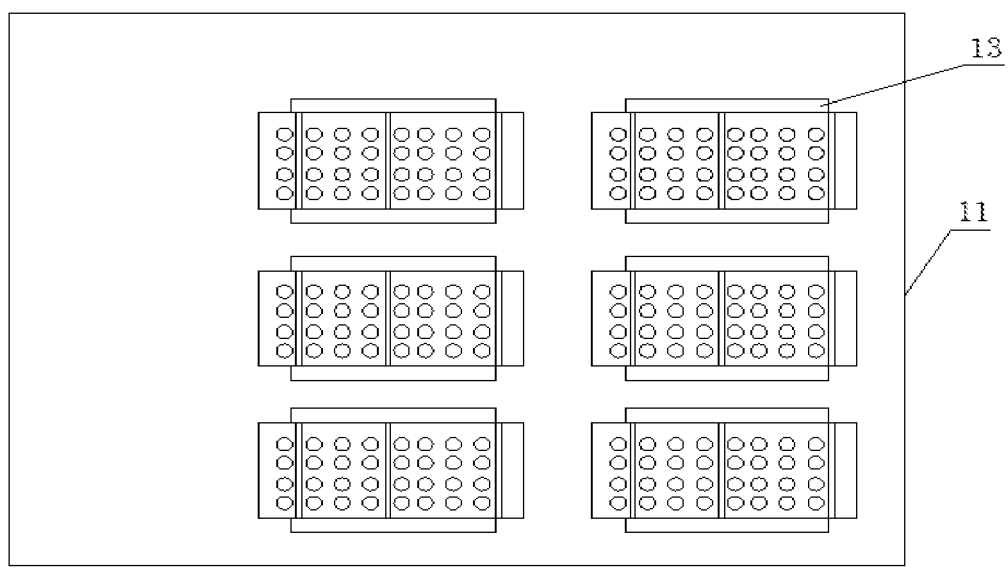
FIG. 2 is a structural diagram of a differential pressure precooling system.

The disclosure will be further described in combination with embodiments. Methods mentioned in the following embodiments are all conventional means, unless specifically illustrated.

The disclosure has 5 technical features that (1) under the conditions that shapes, quantity, field heat and precooling heat of fruits and vegetables are all the same, the fluctuation of environmental temperature of fruits and vegetables is smaller, the temperature reducing speed is more rapid, vice verse. For a heat transfer temperature control differential pressure precooling technology of a totally closed type heat tube, temperature fluctuation in an closed type tunnel environment is mutually independent from that of an external cold source environment (the refrigeration house), that is to say, temperature fluctuation in the closed type tunnel environment is barely influenced by temperature fluctuation of the external cold source environment because precision of temperature fluctuation is $\leq \pm 0.1°$ C. regardless of the reducing speed of the temperature in the closed type tunnel environment so as to facilitate diffusion of field heat of fruits and vegetables from internal to external in a runoff manner in one way, cold is subjected to equal exchange transfer from external to internal, and cold-heat transfer is small in turbulent flow interference. Thus, the precooling of fruits and vegetables is rapid in temperature reduction and high in heat efficiency. However, the traditional differential pressure and static precooling technologies based on a refrigeration house cold source are all of opened type, temperature control fluctuation of such an opened type tunnel and environmental temperature fluctuation of the external cold source are synchronously performed, the precision of temperature fluctuation is generally $\geq \pm 1°$ C. regardless of the temperature reducing speed, cold-heat transfer of fruits and vegetables generates fluctuation confrontation, and the temperature reducing speed is slow. In addition, although the traditional tunnel differential pressure precooling special device and vacuum precooling device are of closed type, the temperature difference between calandria and fans of the air cooler in the tunnel is large and generally exceeds 20-30° C., and large-heat exchange for frosting-defrosting is frequent. (2) For the closed type tunnel differential pressure precooling technology, the humidity in the closed tunnel is constant and unchanged, with no humidifying and constant humidity, heat but not mass transfer, and the lost water of fruits and vegetables during precooling is few. However, for the traditional precooling technology, the humidity in the opened type tunnel is continuously reduced, and fruits and vegetables irreversibly loss water even though humidifying is continuously carried out. (3) For the closed type tunnel differential pressure precooling technology, molecular co-stimulating resistance and antagonism preservation treatment are performed while precooling fruits and vegetables, double missions of first element precooling and second element aging resistance are completed in the period of first golden time after fruits and vegetables are harvested so as to solve a conflict that precooling is difficultly compatible with anti-aging treatment. However, for the traditional opened type technology, precooling and aging resistance is only singly operated because precooling misses the optimal anti-aging time. For example, the optimal ethylene antagonist 1-MCP (1-methylcyclopropene) treatment time is within 12 hours after apples are harvested, and optimal precooling time is within 12 hours after harvesting as well. (4) For the closed type tunnel differential pressure precooling technology, direct impact type nano atomizing or vaporizing, sublimating and stifling treatment are performed while precooling fruits and vegetables so that fruits and vegetables themselves induce disease-resistant sterilization or preservative (microorganism, plant source green chemistry) sterilization or residual pesticide degradation and other treatments to complete multiple missions of precooling and third element induction disease resistance, fourth element sterilization, fifth element residual pesticide degradation and solve a conflict that precooling is compatible with antibacterial treatment. However, for the traditional, opened type technology, precooling and antibacterial disease-resistance anticorrosion are singly performed because optimal antibacterial disease-resistance anticorrosion treatment time is missed due to precooling. For example, optimal times of cold damage (physiological disease) with methyl jasminate and hydrogen peroxide sterilization (infectious disease) anticorrosion after peaches are harvested are both within 12 hours, and optimal precooling time is within 12 hours after harvesting. (5) For the closed type tunnel differential pressure precooling technology, standard controlled atmosphere (CA) or more than 90% hyperoxia or more than 20% high carbon dioxide treatment is performed on the airtight tunnel while precooling fruits and vegetables, for example, hyperoxia treatment is performed on most varieties of apples for about 4 hours within 12 hours after harvesting, polyphenol oxidase activity is inhibited or quinones substances are prevented from being polymerized to form melanin so as to achieve a brown stain preventing effect. More than 80% high carbon dioxide treatment is performed for losing puckery within 12 hours after persimmons are harvested.

Provided are a fruit and vegetable phase-temperature precooling compatible multi-coupling anti-aging treatment technology and device. The structure of the whole device comprises a refrigeration house 11 in which a plurality of differential pressure precooling devices are placed, wherein the structure of the differential pressure precooling device comprises a hermetic seal tunnel precooling box 3 (no thermal insulation), a separator plate 5 is fixedly mounted at an upper part of the inside of the tunnel precooling box and is arranged in parallel to a top wall of the tunnel precooling box with a space formed between the separator plate and the top wall; the separator plate extends to the bottom of the tunnel precooling box; a venting plate 6 is fixedly mounted to one side of the separator plate and is arranged in parallel to a side wall of the tunnel precooling box with a space formed between the venting plate and the side wall; air holes are uniformly distributed on the venting plate, with each hole distance of 5 cm*5 cm and a diameter of 1 cm; a wind shield 12 (each hole distance is 20 cm*20 cm, and each diameter is 1 cm) is mounted at the other side of the separator plate and is used for preventing circulated air from penetrating through the end part of the separator plate in an inclined manner; an axial flow fan 4 is mounted at a corner of the tunnel precooling box, the corner is located between the separator plate and the venting plate; an air inlet of the axial flow fan corresponds to an upper space of the separator plate, and an air outlet corresponds to the space between the venting plate and the side wall of the tunnel precooling box; after the axial flow air fan is turned on, air penetrates from the venting plate, passes through a jujube frame and then circulates to the upper part of the separator plate, flows out after passing through the jujube frame and then returns back to an upper space of the separator plate, so as to complete a round of temperature reduction circulation, thereby achieving circulation in the top cold box of the tunnel. Since there are the separator plate and the venting plate, differential pressure is generated between the upper part and the lower part of the cold box, which can provide a circulating rate and promoting air circulation.

A plurality of fruit frames 8 are arranged in the tunnel precooling box and located between the venting plate and the wind shield, and Lingwu long jujube fruit cases 7 are placed on the fruit frames in multiple rows, and a plurality of fruit cases are stacked in each row, thereby achieving primary precooling on large scale. Wherein, the height of the wind shield is ⅓ that of the venting plate.

A plurality rows of vacuum heat exchange tubes 1 (5 cm$^2$ per tube) are hermetically mounted on the separator plate in an array, one ends of the vacuum heat exchange tubes are located in the tunnel precooling box, and the other ends are located in a refrigeration house; a low temperature in the refrigeration house is introduced into the tunnel precooling box through the vacuum heat exchange tube to achieve rapid temperature reduction in the tunnel precooling box under airtight regulation. Cold air is rapidly circulated to the fruit cases through circulation of the axial flow fan. The heat exchange tubes are fixedly mounted on the tunnel precooling box through a fixing bracket 2.

An ultrasonic nebulizer 9 is mounted on the separator plate at one side close to the axial flow fan; the ultrasonic nebulizer is filled with preservative solution; in the process of cold air circulation, the fan circulates the preservative solution to each corner of the tunnel precooling box; a size of particles of the preservative solution sprayed out from the ultrasonic nebulizer ranges from 0.5 μm to 0.8 μm, this particle can promote micropores on the surface of Lingwu long jujube to absorb the preservative, so as to improve the preservation effect.

In the present application, an absorption layer 10 is placed on the inner layer of the tunnel precooling box to be used for adsorbing excessive preservative drops. After adsorption, excessive preservative can also be repeatedly used by washing the adsorption layer, and the whole device forms a totally closed environment. Compared with the opened type precooling in the prior art, the totally closed type precooling has a completely different effect, and the preservative cannot be added in the opened type precooling. The present application completes deep contact of the preservative and fruits at the stage of precooling so as to complete two processes of precooling and preservation.

The tunnel precooling box can be an aluminium plate or a steel plate, with the thickness of 1-2 mm. In order to prevent the precooling box from being inclined, a support keel 13 can be arranged in the refrigeration house, which takes fixation and support effects on the tunnel precooling box. The length and height of the precooling box are as shown in Figures, the width is 2.5-2.6 m, and the heat tube extends into the the tunnel precooling box by 40-50 cm.

A vacuum heat exchange tube is adopted for heat exchange. Long queue stack is composed of several jujube baskets. The vacuum heat exchange tube is ϕ 19 mm×2 mm in size (external diameter×wall thickness) and 80-100 mm in length, the material is carbon steel, and the internal is in vacuum. The structure of the vacuum heat exchange tube is as follows: the inner wall of a sealed metal tube is covered with a layer of core meshes made of a material having a capillary structure, wherein, an intermediate is hollow, and the tube is filled with a certain heat carrier (liquid nitrogen).

A principle of the vacuum heat exchange tube is as follows: when the heated end of a vacuum heat exchanger starts to be heated, liquid around the tube wall is gasified instantly to generate vapor, at this moment, the pressure of this part is increased, vapor stream can flow to a condensation end under the traction of the pressure, the vapor stream is condensed as liquid after arriving at the condensation end and meanwhile a large amount of heat is discharged, and finally, the liquid returns back to vapor heated end by virtue of capillary force, so as to complete one-time circulation.

The axial flow exhaust fan has a rated air flow of 11000 m³/h, a wind speed of 1.6 m/s and formed pressure difference of 0.16 Pa. The air capacity per hour is 40-60 times of the volume of the tunnel precooling box. Total exchanged heat is 80-100 W³/h.

An ozone generator 14 is also added in the above device to perform ozone sterilization on fruits in the house. An ultraviolet sterilization device 15 is also mounted for sterilizing circulating air.

In the above precooling system, after the differential pressure precooling device performs precooling for 12 hours, a preservative having a molecular intercalation and placeholder function is added in the ultrasonic nebulizer and comprises the following components in parts by mass: 1-3 parts of methyl jasmonate (preventing cold damage, cell membrane integrity), 2-3 parts of Tecto® (thiabendazole, anticorrosion), 2-3 parts of sodium hydrogen peroxide (sterilization, bacteria and fungus), 2-3 parts of salicylic acid (antiaging, atomizing effect) and 0.5-1 part of 1-MCP (anti-aging, ethylene antagonist, grabbing target position, and ethylene does not act).

The preparation steps of the above preservative are as follows:

taking raw materials in parts by weight and dissolving the raw materials with water, wherein, the addition amount of water is 80-100 parts; regulating pH to about 8; and forming a recovery gas after undergoing ultrasound to be circulated together with air circulated in the tunnel precooling box, so that the preservative covers the Lingwu long jujube.

The use method of the preservative is as follows:

The device can ensure that jujubes harvested for the first time are put in a preservation house, so as to keep freshness at any time and lock water at any time. As an example of Lingwu long jujube, after the Lingwu long jujube is preserved in this refrigeration house, the relevant parameters in the preservation process are as follows:

Humidity measurement: by experimental verification, the humidity inside 8 tons of cargoes and an external humidity are kept balanced, static precooling needs 24 hours, and opened type differential pressure precooling needs 13 hours. Simple differential pressure precooling involved in the disclosure only needs 8 hours, and the precooling efficiency of a simple differential pressure precooling device is improved by 3-5 times than that of static precooling, and is improved by almost 1 time than that of opened type differential pressure precooling.

Weight loss ratio of fruits: by experimental verification, 8 tons of cargoes are precooled, the weight loss of statically precooled fruits is 1.05%, the weight loss of opened type differential pressure precooled fruits is 0.83%, the weight loss of fruits using a simple differential pressure precooling device is 0.65% which is significantly superior to those of other two precooling manners.

It is found by experiments that, after the co-stimulating biological resistance preservative is added, storage pretreatment time is significantly shortened, and is shortened by twice. The preservation time of Lingwu long jujube without the preservative is 30 days, the preservation time of Lingwu long jujube after the preservative is added is increased to 90 days, and the preservation length of cargoes is extended by 3 times.

We claim:

1. A device for fruit and vegetable phase-temperature precooling compatible multi-coupling anti-aging treatment, comprising a hermetic seal tunnel precooling box, wherein a separator plate is fixedly mounted at an upper part inside the tunnel precooling box and is arranged in parallel to a top wall of the tunnel precooling box with a space formed between the separator plate and the top wall;

the separator plate extends to a bottom of the tunnel precooling box;
a venting plate is fixedly mounted to one side of the separator plate and is arranged in parallel to a side wall of the tunnel precooling box with a space formed between the venting plate and the side wall;
a section of a wind shield is vertically and downwardly mounted to an end of the other side of the separator plate; an axial flow fan is mounted at a corner of the tunnel precooling box, and the corner is located between the separator plate and the venting plate;
an air inlet of the axial flow fan corresponds to an upper space of the separator plate, and an air outlet of the axial flow fan corresponds to the space between the venting plate and the side wall of the tunnel precooling box;
a plurality of fruit frames are arranged in the tunnel precooling box and located between the venting plate and the wind shield, and Lingwu long jujube fruit cases are stacked on the fruit frames;
a plurality of rows of heat pipes are hermetically mounted on the separator plate in an array, one end of the heat pipes are located in the tunnel precooling box, and the other end are located in a refrigeration house;
a low temperature in the refrigeration house is introduced into the tunnel precooling box through the heat pipes to achieve rapid temperature reduction in the tunnel precooling box under airtight regulation;
an ultrasonic nebulizer is mounted on the separator plate at one side close to the axial flow fan; the ultrasonic nebulizer is filled with preservative solution;
in the process of cold air circulation, the fan circulates the preservative to each corner of the tunnel precooling box;
an ozone generator and an ultraviolet sterilization device are arranged in the hermetic seal tunnel precooling box; the preservative comprises the following components: 1-3 parts of methyl jasmonate, 2-3 parts of thiabendazole, 2-3 parts of sodium hydrogen peroxide, 2-3 parts of salicylic acid and 0.5-1 part of 1-MCP.

2. The device for fruit and vegetable phase-temperature precooling compatible multi-coupling anti-aging treatment according to claim 1, wherein a size of particles of the preservative solution sprayed out from the ultrasonic nebulizer ranges from 0.5 µm to 0.8 µm.

3. The device for fruit and vegetable phase-temperature precooling compatible multi-coupling anti-aging treatment according to claim 1, wherein a length of the wind shield is ⅓ that of the venting plate.

4. The device for fruit and vegetable phase-temperature precooling compatible multi-coupling anti-aging treatment according to claim 1, wherein the preservative is prepared by taking raw materials in parts by weight and dissolving the raw materials with water, wherein, the addition amount of water is 80-100 parts.

\* \* \* \* \*